United States Patent [19]

Parker

[11] Patent Number: 4,871,561
[45] Date of Patent: Oct. 3, 1989

[54] METHOD FOR SALTING MEAT

[75] Inventor: Raymond G. Parker, High Wycombe, England

[73] Assignee: W. R. Grace & Co.-Conn., Duncan, S.C.

[21] Appl. No.: 167,819

[22] Filed: Mar. 14, 1988

[30] Foreign Application Priority Data

Apr. 2, 1987 [GB] United Kingdom ................ 8707845

[51] Int. Cl.⁴ .............................................. A23B 4/02
[52] U.S. Cl. .................................. 426/281; 426/129; 426/332
[58] Field of Search ............... 426/281, 264, 266, 641, 426/332, 129, 410

[56] References Cited

U.S. PATENT DOCUMENTS 1,951,436  3/1934  Paddock ............................. 426/281
4,463,027  7/1984  Chandler et al. .................. 426/266

FOREIGN PATENT DOCUMENTS 967578   8/1964   United Kingdom .
1014701  12/1965  United Kingdom .
1058826  2/1967   United Kingdom .

Primary Examiner—Donald E. Czaja
Assistant Examiner—Helen Pratt
Attorney, Agent, or Firm—William D. Lee, Jr.; John J. Toney; Mark B. Quatt

[57] ABSTRACT

Meat, especially pork, is cured by injection of saturated brine having microfine salt suspended therein. The method is especially advantageous when the meat is subsequently to be cured in a sealed plastic bag, and makes it possible to achieve salt contents not readily obtainable by other means.

9 Claims, No Drawings

METHOD FOR SALTING MEAT

This invention relates to the salting (curing) of meat, especially pork to produce bacon. As used herein, the term "bacon" is used generically to cover all pork-derived products which are sold after salting, e.g. gammon, collar, hock, and slipper, as well as the various forms of bacon itself.

Meat is customarily preserved by treatment with salt. For this purpose the salt must penetrate the interior of the meat. To speed up this process, it is customary to inject brine, i.e. salt solution, into the meat through fine nozzles. The meat so injected may then be immersed in brine to complete the process. Current food regulations require that meat which contains more than 10% of added water must be labelled to show the amount of water added. It is therefore normal practice to sell meat containing not more than 10% of added water. The shelf life of salted meat depends upon the salt content. For a shelf life of about four weeks, which is appropriate for retailers who have a rapid turnover of stock, a salt content of about 2.5 to about 2.75% is adequate, but for a shelf life longer than this, e.g. six weeks, the salt content must be increased up to 2.75 to 3.5% by weight. Such high salt contents cannot be achieved by injection of brine into meat, and it is necessary to follow such injection with an immersion in a brine bath if this level of salt is required.

There has been considerable interest in recent years in curing meat inside sealed plastic bags. To operate this method, the meat is first injected with brine in the manner already described, and the injected meat is then placed in a plastic bag which is sealed and usually heat shrunk. After the salt has had time to permeate evenly through the meat, the cured meat may be removed from the bag and sliced and repackaged in the usual way. This method of curing meat has the advantage of greater cleanliness and avoiding the use of brine baths. However, it has not heretofore been possible to achieve salt contents over about 2.75% using this method of curing meat in a bag. The present invention provides a method of overcoming this problem.

According to the present invention meat, especially pork, is cured by injection of saturated brine which has suspended therein salt particles capable of passing through a sieve having apertures of 100 micrometers, and preferably capable of passing through a sieve having apertures of 50 micrometers. Such so-called "microfine salt" is commercially available for incorporation into butter where the fine particle size is required to permit homogeneous mixing and prevent any sensation of grittiness in the butter. Salt of ordinary particle size cannot be used in the present invention since it clogs the injection nozzles and cannot be satisfactorily injected into the meat.

The suspension of microfine salt in brine may be made up at the time of use. The saturated brine itself may be made by dissolving ordinary coarse salt in water with the addition of the usual preservatives such as nitrates, nitrites and/or ascorbic acid in the usual amounts. The microfine salt is then added at a rate dependent upon the desired final salt content of the meat, usually at a rate of 20 to 80 parts by weight preferably 35 to 70 parts by weight, of microfine salt per 1000 parts by weight of saturated brine. As already indicated, the normal levels of preservatives may also be added to the injection mixture. Since there is a danger of recrystallization of the microfine salt if it remains suspended in the brine for any length of time, it is desirable to make up the suspension for injection only shortly before it is required for use.

The present invention is especially advantageous for use with methods for curing meat, e.g. pork, in sealed plastic bags since it provides a solution to the above-mentioned problem, namely that salt levels above about 2.75% cannot be achieved using this method simply by injecting saturated brine into the meat. The invention thus makes it possible to produce bacon and other salted meats having a shelf life of six weeks using the method of curing meat in a sealed plastic bag.

The following Examples describe in more detail the salting of meat using the method of the present invention.

EXAMPLE 1

Joints of pork weighing 3 to 12 kg each and containing no bone were injected using a multi-needle injector (Formaco) with a brine mixture having the following composition:
water: 740 parts by weight
pure vacuum dried (PVD) salt: 260 parts by weight
microfine salt: 64 parts by weight
nitrate and nitrite: usual levels The PVD salt was dissolved in the water before the addition of the microfine salt. This suspension of microfine salt in brine at a temperature of $+1°$ C. to $+2°$ C. was injected into the meat held at a temperature of $4°$ C. to $5°$ C. The amount injected was such as to add to the meat 9.8% of water and 3.2% of salt. After injection the joints of meat were packaged in standard heat shrinkable plastic laminate bags (as sold under the registered trade mark Cryovac BBl).

The joints subjected to this process were 10 middles, 10 backs, 10 streaks, 10 legs and 10 fores. Analysis of the joints of meat after 7 days showed that the middles contained 3.1% to 3.2% salt, the backs 3.0% to 3.1% salt, the streaks 2.2% to 2.3% salt, the legs 2.3% to 2.7% salt, and the fores 3.2% to 3.6% salt. The low figures obtained with the streaks can be accounted for by the presence of less lean meat in cuts of this kind. It is the lean meat that takes up the salt. The low FIGURE with the legs was attributable to variations in brine injection. As shown in Example 2, with careful control of brine injection the required salt level can be achieved without difficulty.

EXAMPLE 2

Pork sides divided into a variety of different cuts were injected with a brine comprising:
water: 531 parts by weight
PVD salt: 184 parts by weight
microfine salt: 40 parts by weight
nitrite: normal amount The brine temperature was $+5°$ C. and the meat temperature was $3°$ C. to $4°$ C. A multi-needle Formaco injector was used, the objective being to add 10% of water and about 3.5% of salt to the meat. After injection, the major cuts were subdivided and enclosed in sealed plastic bags to complete the curing process. It was found that the middles took up 4.6% of salt, the backs 3.3% of salt, the streaks 2.3% of salt, the legs 3.8% of salt, the range of salt contents for the various cuts being from 2.3% to 4.6%. Again the low percentage of salt achieved with the streaks was attributable to the high proportion of fat in this cut.

The present invention provides a significant improvement in the curing of meat, especially pork, in sealed plastic bags. Heretofore the inherent advantages of this method in terms of greater flexibility and better protection for the meat during the curing process have been to some extent reduced by the impracticability of achieving salt contents higher than about 2.75%: This obstacle has now been removed, and the method provides the meat processor with a way of curing meat which permits great flexibility especially in deciding whether given cuts of meat shall be sold as such or cured.

I claim:

1. Method for curing meat with salt which comprises injecting into meat saturated brine having suspended therein solid salt having a particle size not greater than 100 micrometers.

2. Process according to claim 1 in which the salt has a particle size less than 50 micrometers and including the steps of preparing said saturated brine suspension by adding the said salt particles to said brine immediately before injection of the meat and then performing the injection before the particulate salt can re-crystallize.

3. Process according to claim 1 or 2 in which the salt is injected to provide a salt content from 2.75% to 4% by weight of the meat.

4. Process according to claim 3 in which the meat is injected with not more than 10% by weight of added water.

5. Process according to claim 2 in which the salt suspension contains 20 to 80 parts by weight of the said finely divided salt per 1000 parts by weight of saturated brine and is at a temperature of about 1° C. to 2° C.: when injected into the meat which is held at a temperature of about 4° C. to 5° C.

6. Process according to claim 5 in which the said salt suspension contains 35 to 70 parts by weight of the said finely divided salt per 1000 parts by weight of the saturated brine.

7. Process according to claim 6 in which the brine also contains water-soluble meat preservatives.

8. Process according to claim 1 in which the meat injected is pork.

9. Process according to claim 1 in which after the injection the meat is kept in a sealed plastic bag until the salt has become essentially evenly distributed throughout the meat.

* * * * *